US011153234B2

(12) United States Patent
Wu

(10) Patent No.: US 11,153,234 B2
(45) Date of Patent: Oct. 19, 2021

(54) PROVIDING NEW RECOMMENDATION IN AUTOMATED CHATTING

(71) Applicants: Microsoft Technology Licensing, LLC, Redmond, WA (US); Xianchao Wu, Tokyo (JP)

(72) Inventor: Xianchao Wu, Tokyo (JP)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/484,596

(22) PCT Filed: Mar. 31, 2017

(86) PCT No.: PCT/CN2017/079111
§ 371 (c)(1),
(2) Date: Aug. 8, 2019

(87) PCT Pub. No.: WO2018/176413
PCT Pub. Date: Oct. 4, 2018

(65) Prior Publication Data
US 2020/0036659 A1    Jan. 30, 2020

(51) Int. Cl.
*H04L 12/58* (2006.01)
*G06N 20/00* (2019.01)
(Continued)

(52) U.S. Cl.
CPC .......... *H04L 51/02* (2013.01); *G06F 16/3329* (2019.01); *G06F 16/9535* (2019.01);
(Continued)

(58) Field of Classification Search
CPC ...... G06F 13/00; G06F 16/258; G06F 16/332; G06F 16/3329; G06F 16/9535;
(Continued)

(56) References Cited

U.S. PATENT DOCUMENTS 8,185,448 B1    5/2012  Myslinski
8,447,823 B2 *  5/2013  Zhang ................ G06Q 30/0269
                                                709/206
(Continued)

FOREIGN PATENT DOCUMENTS

CN    103109288 A    5/2013
CN    104951077 A    9/2015
(Continued)

OTHER PUBLICATIONS

Morales et al, "From Chatter to Headlines: Harnessing the Real-Time Web for Personalized News Recommendation"; pp. 153-162; published Feb. 12, 2012 (Year: 2012).*
(Continued)

*Primary Examiner* — Robert B Harrell
(74) *Attorney, Agent, or Firm* — Schwegman Lundberg & Woessner, P.A.

(57) ABSTRACT

The present disclosure provides method and apparatus for providing news recommendation in automated chatting. A first message may be obtained in a chat flow. Recommended news may be determined based at least on the first message, a user preference list including sentiment labels, and a news dataset including sentiment labels. At least one of title, summarization and content of the recommended news may be provided based on the first message.

20 Claims, 10 Drawing Sheets

(51) Int. Cl.
| | |
|---|---|
| *G06F 16/332* | (2019.01) |
| *G06F 16/9535* | (2019.01) |
| *G06F 40/30* | (2020.01) |
| *G06N 5/02* | (2006.01) |
| *G06N 5/04* | (2006.01) |
| *H04L 29/08* | (2006.01) |
| *G10L 15/18* | (2013.01) |
| *G10L 15/22* | (2006.01) |
| *G10L 13/00* | (2006.01) |

(52) U.S. Cl.
CPC .............. *G06F 40/30* (2020.01); *G06N 5/02* (2013.01); *G06N 5/04* (2013.01); *G06N 20/00* (2019.01); *H04L 67/306* (2013.01); *G10L 13/00* (2013.01); *G10L 15/1815* (2013.01); *G10L 15/22* (2013.01)

(58) Field of Classification Search
CPC ...... G06F 15/16; G06F 17/27; G06F 17/2785; G06F 40/30; G06N 5/02; G06N 5/04; G06N 20/00; G06Q 10/107; G06Q 30/0269; G06Q 30/0611; G06Q 30/0613; G06Q 30/0625; G10L 15/22; G10L 15/1815; G10L 13/00; G10L 15/18; H04L 12/58; H04L 12/581; H04L 12/585; H04L 12/5855; H04L 29/08; H04L 51/02; H04L 51/04; H04L 51/046; H04L 67/00; H04L 67/10; H04L 67/306; H04L 67/02
USPC ......................................................... 709/206
See application file for complete search history.

(56) References Cited

U.S. PATENT DOCUMENTS

| | | | |
|---|---|---|---|
| 8,448,204 B2 | 5/2013 | Johnson et al. | |
| 8,818,926 B2 | 8/2014 | Wallace | |
| 9,031,216 B1 | 5/2015 | Kamvar et al. | |
| 9,386,113 B1 | 7/2016 | Goncharuk et al. | |
| 9,514,227 B1 | 12/2016 | Garrett et al. | |
| 2011/0154400 A1 | 6/2011 | Johnson et al. | |
| 2012/0215871 A1* | 8/2012 | Zhang ................ | G06Q 30/0625 709/206 |
| 2014/0129651 A1 | 5/2014 | Gelfenbeyn et al. | |
| 2014/0343950 A1 | 11/2014 | Simpson et al. | |
| 2015/0172240 A1 | 6/2015 | Back | |
| 2015/0206000 A1 | 7/2015 | El Kaliouby et al. | |
| 2016/0094492 A1 | 3/2016 | Li et al. | |
| 2016/0359777 A1 | 12/2016 | Tucker et al. | |
| 2017/0032257 A1* | 2/2017 | Sharifi .............. | G06F 16/24578 |

FOREIGN PATENT DOCUMENTS

| | | |
|---|---|---|
| CN | 105345818 A | 2/2016 |
| CN | 105843381 A | 8/2016 |
| CN | 105975622 A | 9/2016 |
| CN | 106326440 A | 1/2017 |
| CN | 16484596 A | 3/2017 |
| WO | 2012009832 A1 | 1/2012 |
| WO | 2015187048 A1 | 12/2015 |

OTHER PUBLICATIONS

"First Office Action and Search Report Issued in Chinese Patent Application No. 201780035947.8", dated Aug. 18, 2020, 21 Pages.
"Extended European Search Report Issued in European Patent Application No. 17903513.4", dated Jul. 17, 2020 7 Pages.
"Office Action Issued in European Patent Application No. 17903513. 4", dated Aug. 21, 2019, 3 Pages.
Christine Becker, "Changing User Interface in News Recommendation Systems—from Browsing to Chatting", Retrieved From: https://blog.breakingbot.news/shifting-user-interface-in-news-recommendation-systems-from-browsing-to-chatting-ba265647c00b, Published on: Sep. 26, 2016, 6 Pages.
Techlabs, Maruti, "News Made Personal with Chatbots", Retrieved From: https://chatbotslife.com/news-made-personal-with-chatbots-6dbba0691475, Published on: Nov. 18, 2016, pp. 1-6.
Bernard, Travis, "TechCrunch Launches a Personalized News Recommendations Bot on Facebook Messenger", Retrieved From: https://techcrunch.com/2016/04/19/all-your-bots-are-belong-to-us/, Published on: Apr. 19, 2016, 6 Pages.
Blom, et al., "A Sentiment-Based Chat Bot", Retrieved From: http://www.csc.kth.se/utbildning/kth/kurser/DD143X/dkand13/Group8Anna/report/TwitterBot_AlexanderSofie.pdf, April 6, 2013, 24 Pages.
O'Kane, Sean, "Quartz's New App Wants to Text You the News", Retrieved From: http://www.theverge.com/2016/2/11/10963794/quartz-app-iphone-ios-the-atlantic-download, Published on: Feb. 11, 2016, pp. 1-5.
Patel, Sahil, "Fusion will Now Emoji the News using Facebook Messenger", Retrieved From: http://digiday.com/publishers/fusion-will-now-emoji-news-using-facebook-messenger/, May 26, 2016, 6 Pages.
"International Search Report and Written Opinion Issued in PCT Application No. PCT/CN17/079111", dated Jun. 30, 2017, 11 Pages.
"Office Action Issued in European Patent Application No. 17903513. 4", dated May 12, 2021, 4 Pages.
"Second Office Action and Search Report Issued in China Patent Application No. 201780035947.8", (w/ Concise Statement of Relevance), dated Apr. 1, 2021, 15 Pages.

* cited by examiner

PROVIDING NEW RECOMMENDATION IN AUTOMATED CHATTING

CROSS-REFERENCE TO RELATED APPLICATIONS

This application is a U.S. National Stage Filing under 35 U.S.C. 371 of International Patent Application Serial No. PCT/CN2017/079111, filed Mar. 31, 2017, and published as WO 2018/176413 A1 on Oct. 4, 2018, which application and publication are incorporated herein by reference in their entirety.

BACKGROUND

Artificial Intelligence (AI) chatbot is designed to simulate people's conversation, and may provide an automated chatting service to users by text, speech, image, etc. The chatbot is being applied in an increasing number of scenarios. For example, the chatbot may provide news recommendation to users in automated chatting.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure propose method and apparatus for providing news recommendation in automated chatting. A first message may be obtained in a chat flow. Recommended news may be determined based at least on the first message, a user preference list including sentiment labels, and a news dataset including sentiment labels. At least one of title, summarization and content of the recommended news may be provided based on the first message.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

In some aspects, embodiments of the present disclosure may enable a chatbot to provide news recommendation to a user in an interactive way. The chatbot may chat with the user by natural language in a chat flow, and provide news recommendation during automated chatting. Herein, the chat flow refers to a chatting procedure including messages from the user and responses from the chatbot. The chatting between the chatbot and the user may be in a form of text or voice.

In some aspects, the chatbot may help the user to obtain news information in a "fast" way. For example, the chatbot may provide a summarization of recommended news, instead of the complete news, to the user, and thus the user may learn about the recommended news in a short time without the need of reading or listening the complete news.

In some aspects, the chatbot may provide news recommendation in a "depth" way. For example, the chatbot may pre-establish a knowledge-based question-answer (QA) set for a number of candidate news. When the user is asking a question on the recommended news that is selected from the candidate news, the chatbot may provide an answer to the user's question based on the knowledge-based QA set.

In some aspects, the chatbot may provide news recommendation in a "width" way. For example, if the user intends to switch to other news, the chatbot may provide other recommended news based on a topic graph in an effective approach. Said other recommended news may be associated with the previous recommended news in terms of event type, people, time, location, etc.

In some aspects, the chatbot may collect user preferences on news, and provide personalized news recommendation accordingly.

In some aspects, the chatbot may provide news recommendation based on sentiment analysis. On one hand, the recommended news may be determined based on the sentiment analysis. On the other hand, the chatbot may provide sentiment analysis distribution information of the recommended news or sentiment analysis distribution information of social comments to the recommended news to the user.

Figure 1:
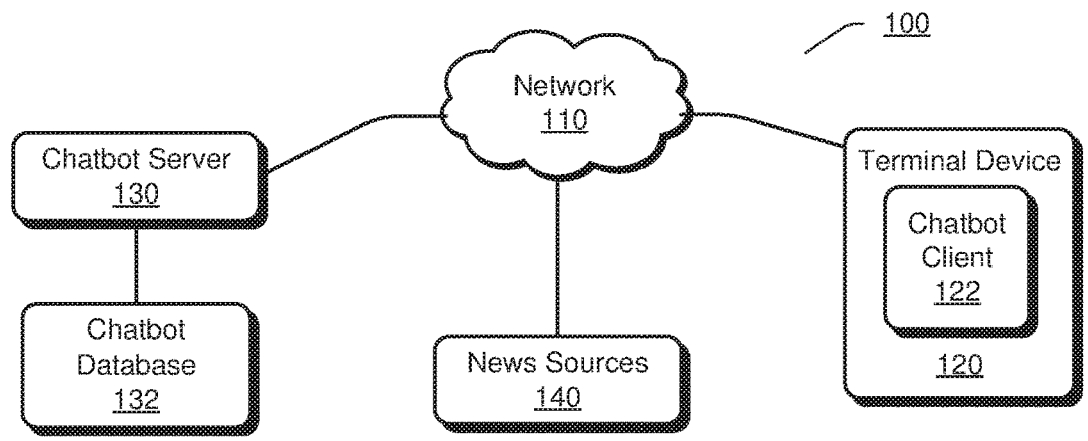
FIG. 1 illustrates an exemplary application scenario of a chatbot according to an embodiment.

FIG. 1 illustrates an exemplary application scenario 100 of a chatbot according to an embodiment.

In FIG. 1, a network 110 is applied for interconnecting among a terminal device 120, a chatbot server 130 and news sources 140.

The network 110 may be any type of networks capable of interconnecting network entities. The network 110 may be a single network or a combination of various networks. In terms of coverage range, the network 110 may be a Local Area Network (LAN), a Wide Area Network (WAN), etc. In terms of carrying medium, the network 110 may be a wireline network, a wireless network, etc. In terms of data switching techniques, the network 110 may be a circuit switching network, a packet switching network, etc.

The terminal device 120 may be any type of electronic computing devices capable of connecting to the network 110, assessing servers or websites on the network 110, processing data or signals, etc. For example, the terminal device 120 may be a desktop computer, a laptop, a tablet, a smart phone, etc. Although only one terminal device 120 is shown in FIG. 1, it should be appreciated that a different number of terminal devices may connect to the network 110.

The terminal device 120 may include a chatbot client 122 which may provide automated chatting service for a user. In some implementations, the chatbot client 122 may interact with the chatbot server 130. For example, the chatbot client 122 may transmit messages inputted by the user to the chatbot server 130, and receive responses associated with the messages from the chatbot server 130. However, it should be appreciated that, in other implementations, instead of interacting with the chatbot server 130, the chatbot client 122 may also locally generate responses to messages inputted by the user.

The chatbot server 130 may connect to or incorporate a chatbot database 132. The chatbot database 132 may comprise information that can be used by the chatbot server 130 for generating responses.

The news sources 140 may refer to news websites or news channels that can provide news or reports to the public.

In some implementations, the chatbot server 130 may collect news information from the news sources 140 and determine recommended news for the user of the terminal device 120. The chatbot client 122 may interact with the chatbot server 130 and present the determined recommended news to the user.

It should be appreciated that all the network entities shown in FIG. 1 are exemplary, and depending on specific application requirements, any other network entities may be involved in the application scenario 100.

Figure 2:
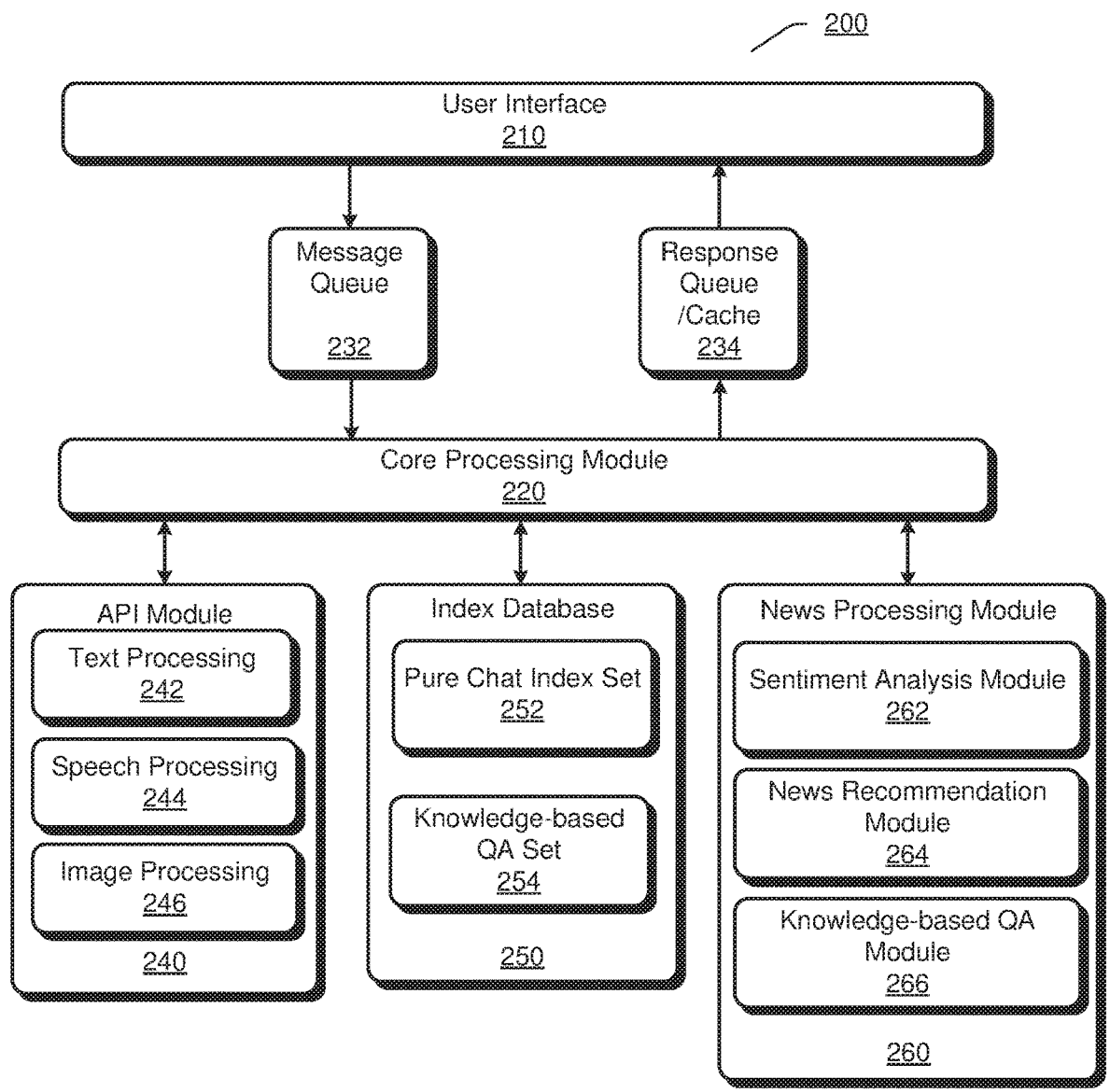
FIG. 2 illustrates an exemplary chatbot system according to an embodiment.

FIG. 2 illustrates an exemplary chatbot system 200 according to an embodiment.

The chatbot system 200 may comprise a user interface (UI) 210 for presenting a chat window. The chat window may be used by the chatbot for interacting with a user.

The chatbot system 200 may comprise a core processing module 220. The core processing module 220 is configured for, during operation of the chatbot, providing processing capabilities through cooperation with other modules of the chatbot system 200.

The core processing module 220 may obtain messages inputted by the user in the chat window, and store the messages in the message queue 232. The messages may be in various multimedia forms, such as, text, speech, image, video, etc.

The core processing module 220 may process the messages in the message queue 232 in a first-in-first-out manner. The core processing module 220 may invoke processing units in an application program interface (API) module 240 for processing various forms of messages. The API module 240 may comprise a text processing unit 242, a speech processing unit 244, an image processing unit 246, etc.

For a text message, the text processing unit 242 may perform text understanding on the text message, and the core processing module 220 may further determine a text response.

For a speech message, the speech processing unit 244 may perform a speech-to-text conversion on the speech message to obtain text sentences, the text processing unit 242 may perform text understanding on the obtained text sentences, and the core processing module 220 may further determine a text response. If it is determined to provide a response in speech, the speech processing unit 244 may perform a text-to-speech conversion on the text response to generate a corresponding speech response.

For an image message, the image processing unit 246 may perform image recognition on the image message to generate corresponding texts, and the core processing module 220 may further determine a text response. In some cases, the image processing unit 246 may also be used for obtaining an image response based on the text response.

Moreover, although not shown in FIG. 2, the API module 240 may also comprise any other processing units. For example, the API module 240 may comprise a video processing unit for cooperating with the core processing module 220 to process a video message and determine a response.

The core processing module 220 may determine responses through an index database 250. The index database 250 may comprise a plurality of index items that can be retrieved by the core processing module 220 as responses. The index items in the index database 250 may be classified into a pure chat index set 252 and a knowledge-based QA set 254. The pure chat index set 252 may comprise index items that are prepared for free chatting between users and the chatbot, and may be established with data from social networks. The index items in the pure chat index set 252 may or may not be in a form of question-answer pair. The question-answer pair may also be referred to as message-response pair. The knowledge-based QA set 254 may comprise question-answer pairs generated based on news information from news websites or news providers on the network.

The core processing module 220 may utilize a news processing module 260 for determining news recommendation as responses to messages from the users. Herein, the news recommendation may include at least one of, such as, title of the recommended news, summarization of the recommended news, content of the recommended news, answers to questions on the recommended news, sentiment analysis distribution information of the recommended news, sentiment analysis distribution information of social comments to the recommended news, etc.

The news processing module 260 may comprise a sentiment analysis module 262, a new recommendation module 264 and a knowledge-based QA module 266. The sentiment analysis module 262 may be configured for performing sentiment analysis on, such as, news, messages from the user, etc. A sentiment analysis classifier may be adopted by the sentiment analysis module 262, which is established through machine learning or deep learning based on a training dataset and may be used for classifying inputted content into one of a plurality of emotions. The new recommendation module 264 may be configured for determining recommended news through a learning-to-rank (LTR) news recommendation model. The knowledge-based QA module 266 may be configured for establishing the knowledge-based QA set 254 and determining an answer to a message from the knowledge-based QA set 254.

The responses determined by the core processing module 220 may be provided to a response queue or response cache 234. For example, the response cache 234 may ensure that a sequence of responses can be displayed in a pre-defined time stream. Assuming that, for a message, there are no less than two responses determined by the core processing module 220, then a time-delay setting for the responses may be necessary. For example, if a message inputted by the player is "Did you eat your breakfast?", two responses may be determined, such as, a first response "Yes, I ate bread" and a second response "How about you? Still feeling hungry?". In this case, through the response cache 234, the chatbot may ensure that the first response is provided to the player immediately. Further, the chatbot may ensure that the second response is provided in a time delay, such as 1 or 2 seconds, so that the second response will be provided to the player 1 or 2 seconds after the first response. As such, the response cache 234 may manage the to-be-sent responses and appropriate timing for each response.

The responses in the response queue or response cache 234 may be further transferred to the user interface 210 such that the responses can be displayed to the user in the chat window.

It should be appreciated that all the elements shown in the chatbot system 200 in FIG. 2 are exemplary, and depending on specific application requirements, any shown elements may be omitted and any other elements may be involved in the chatbot system 200.

Figure 3:
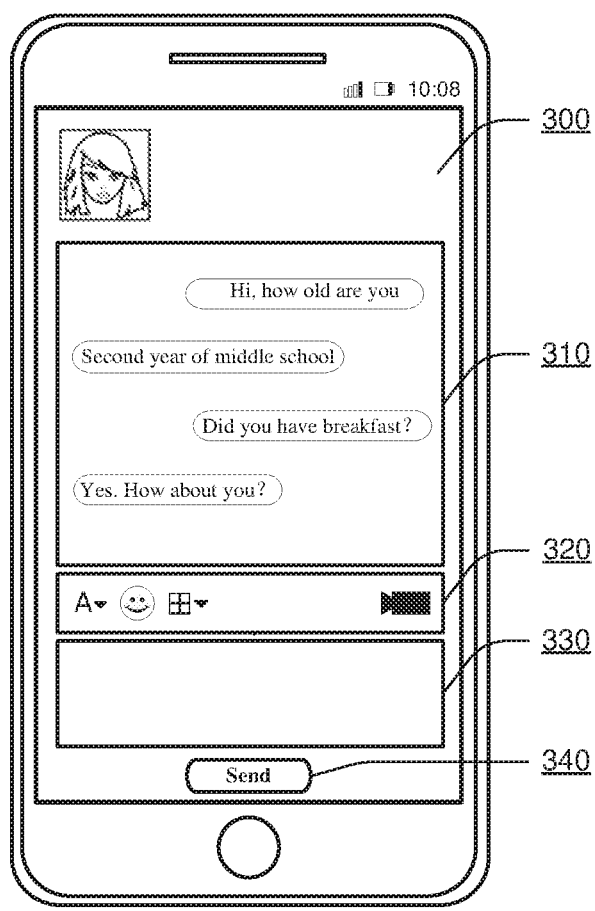
FIG. 3 illustrates an exemplary chat window according to an embodiment.

FIG. 3 illustrates an exemplary chat window 300 according to an embodiment. The chat window 300 may comprise a presentation area 310, a control area 320 and an input area 330. The presentation area 310 displays messages and responses in a chat flow. The control area 320 includes a plurality of virtual buttons for the user to perform message input settings. For example, the user may select to make a voice input, attach image files, select emoji symbols, make a short-cut of the current screen, etc. through the control area 320. The input area 330 is used for the user to input messages. For example, the user may type text through the input area 330. The chat window 300 may further comprise a virtual button 340 for confirming to send inputted messages. If the user touches the virtual button 340, the messages inputted in the input area 330 may be sent to the presentation area 310.

It should be noted that all the elements and their layout shown in FIG. 3 are exemplary. Depending on specific application requirements, the chat window in FIG. 3 may omit or add any elements, and the layout of the elements in the chat window in FIG. 3 may also be changed in various manners.

Figure 4:
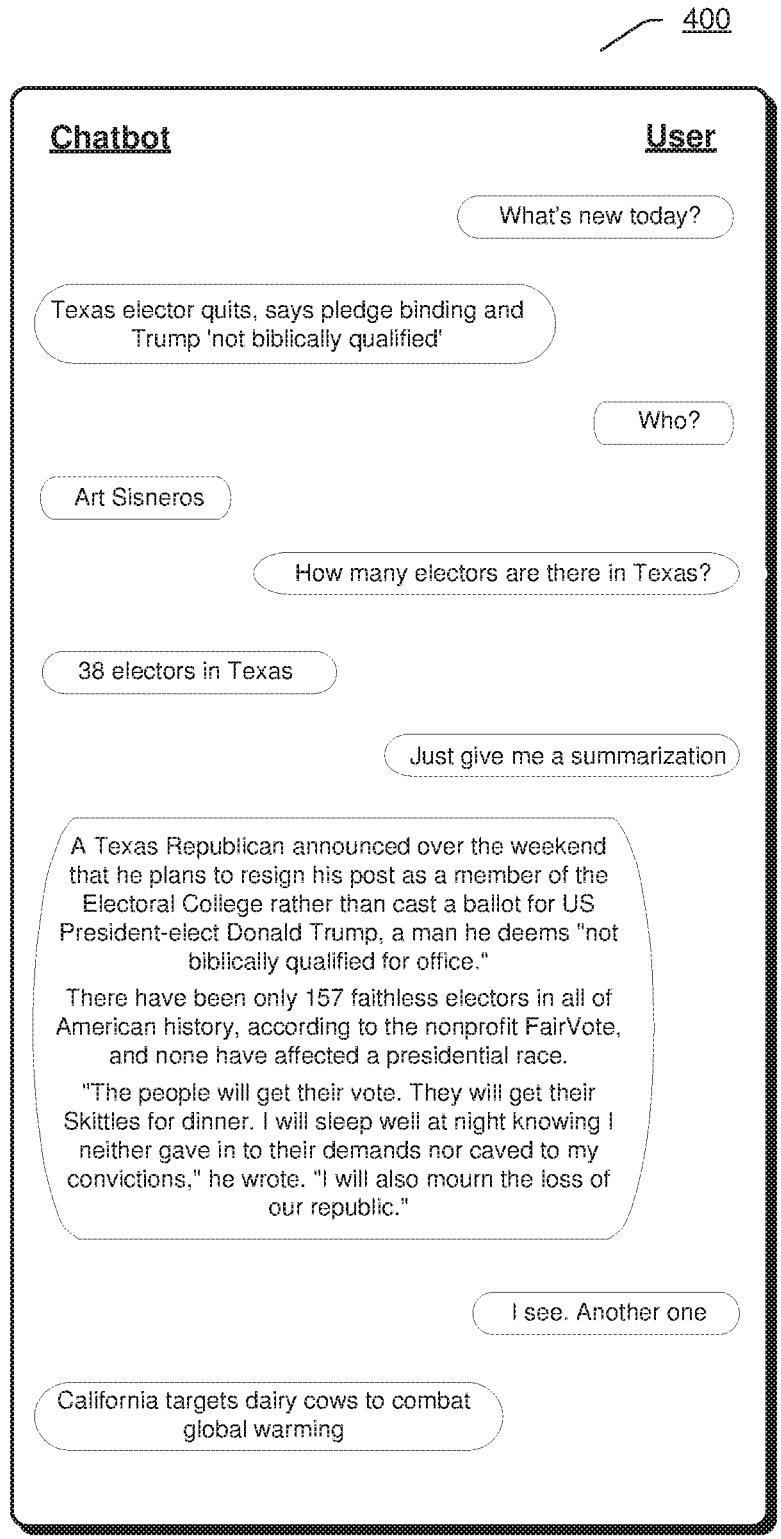
FIG. 4 illustrates an exemplary chat flow for providing news recommendation according to an embodiment.

FIG. 4 illustrates an exemplary chat flow 400 for providing news recommendation according to an embodiment.

When obtaining a message "What's new today?" from the user, the chatbot may know that the user intends to obtain a news recommendation, and may determine recommended news accordingly. The chatbot may provide the user with a title of the recommended news "Texas elector quits, says pledge binding and Trump 'not biblically qualified'". Then, the user asks "Who?", and the chatbot provides an answer "Art Sisneros". When the user asks "How many electors are there in Texas?", the chatbot provides an answer "38 electors in Texas". The user further inputs a message "Just give me a summarization", and the chatbot provides a summarization of the recommended news to the user. When the user inputs a message "I see. Another one", the chatbot may know that the user intends to switch to another news recommendation, and thus may provide a title of other recommended news "California targets dairy cows to combat global warming".

Figure 5:
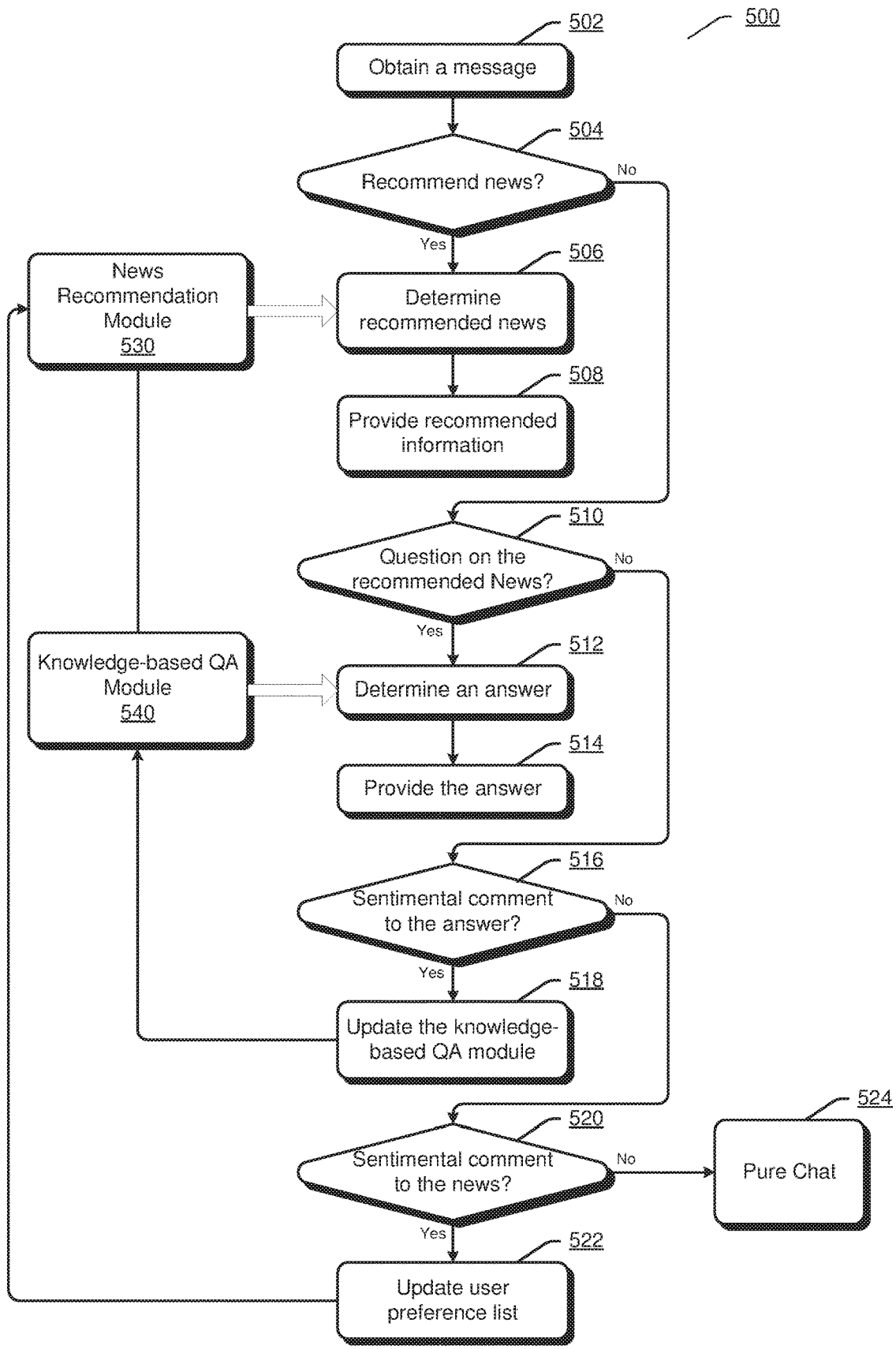
FIG. 5 illustrates a flowchart of an exemplary method for providing news recommendation according to an embodiment.

FIG. 5 illustrates a flowchart of an exemplary method 500 for providing news recommendation according to an embodiment. The method 500 may be performed by, such as, the news processing module 260 in FIG. 2 for providing news recommendation to a user who is chatting with a chatbot.

At 502, a message may be obtained. For example, the user may input a message in a chat flow with the chatbot in a terminal device, and the chatbot may receive the message in a UI of the terminal device. The message may be, such as, a requirement on news recommendation, a question on recommended news, comment on the recommended news, comment on an answer from the chatbot to a question of the user, a requirement on another news recommendation, a message for pure chat, etc.

At 504, it is determined whether recommended news shall be provided. In an implementation, it may be determined at 504 that whether the message indicates an intension of the user to obtain news recommendation. For example, when obtaining a message like "What's new today?", "News", "How about the presidential election?", etc., it can be determined that the user intends to obtain news recommendation. Various approaches may be adopted for performing the determination at 504. For example, a logistic regression classifier may be trained by n-gram word features, where the n-gram word features are generated based on news-related words determined from a news corpus. The logistic regression classifier may be used for determining whether the message indicates an intension of obtaining news recommendation.

If it is determined at 504 to recommend news, recommended news may be determined at 506. For example, a news recommendation module 530 may be used for determining the recommended news. In an implementation, the recommended news may be determined based at least on the message, a user preference list and a news dataset.

The user preference list includes information on news that the user is interested in. For example, the user preference list may comprise keywords of the interested news, and/or categories of the interested news. The keywords of the interested news may be words recited in the news that are representative or with a high importance. The categories of the interested news may refer to categories to which topics of the news belong, such as, politics, sports, economics, etc.

The user preference list may further comprise sentiment labels of the keywords and/or categories. The sentiment labels are determined through sentiment analysis to indicate corresponding emotions. The user preference list may be established and updated with the using of news recommendation service by the user. For example, the chatbot may keep collecting user behaviors in the news recommendation service, such as, feedbacks or comments from the user on the news recommendation, and establish and update the user preference list.

The news dataset may include a number of candidate news, from which the recommend news is selected. For example, the news dataset may comprise a number of candidate news items, each item corresponding to a piece of candidate news. An item corresponding to a piece of candidate news may include at least one of: title of the candidate news, summarization of the candidate news, content of the candidate news, comments to the candidate news, a sentiment label of the candidate news, a sentiment label of the comments, etc.

The details of determining the recommend news will be explained in connection with FIG. 8 later.

At 508, recommended information may be provided to the user. The recommend information may be at least one of title of the recommended news, summarization of the recommended news, content of the recommended news, etc.

If determined at 504 not to recommend news, the method 500 may further determine at 510 whether the message includes a question on the recommended news that has been provided to the user. For example, the messages "Who?" and "How many electors are there in Texas?" in FIG. 4 are questions on the recommended news "Texas elector quits, says pledge binding and Trump 'not biblically qualified'".

In some cases, this type of message contains words related to the recommended news, such as, the message "How many electors are there in Texas?". A gradient boosting decision tree (GBDT) classifier may be trained by using features, such as, the number of words shared between a message and recommended news and/or a Word2vec cosine similarity score between the message and the recommended news. The GBDT classifier may be used for performing the determination at 510.

In other cases, this type of message may be short, such as, the message "Who?". Thus, additional features may be applied in the GBDT classifier, such as, whether a message contains a question word, whether the user's voice is in a question tone, etc.

If the message is determined as a question on the recommended news at 510, an answer to the question may be determined at 512. For example, a knowledge-based QA module 540 may be used for determining the answer. The knowledge-based QA module 540 may establish a knowledge-based QA set. The knowledge-based QA set may include a number of question-answer pairs generated based on news information. The answer to the question of the user may be determined from the knowledge-based QA set.

The details of determining the answer will be explained in connection with FIG. 9 later.

At 514, the answer may be provided to the user.

If determined at 510 that the message is not a question on the recommended news, the method 500 may further determine at 516 whether the message includes sentimental comment to the answer. The sentimental comment refers to a comment with a type of emotion, such as, a positive comment or a negative comment. A sentiment analysis module may be used for determining whether the message is a comment on the answer with a positive emotion, e.g., happy, etc., or with a negative emotion, e.g., sad, angry, etc. An example of positive comment may be "Great!", and an example of negative comment may be "Totally wrong!".

If the message is determined as sentimental comment to the answer at 516, the knowledge-based QA module 540 may be updated according to the message at 518. For example, if the message is a positive comment to the answer, the weight of the answer may be enhanced within the knowledge-based QA module 540, while if the message is a negative comment to the answer, the weight of the answer may be reduced within the knowledge-based QA module 540 or an updated answer may be determined by the knowledge-based QA module 540.

If determined at 516 that the message is not sentimental comment to the answer, the method 500 may further determine at 520 whether the message includes sentimental comment to the recommended news. The sentiment analysis module may also be used for determining whether the sentimental comment to the recommended news is a positive comment or a negative comment.

If the message is determined as sentimental comment to the recommended news at 520, the user preference list may be updated according to the message at 522. The sentimental comment may be used for updating the user preference list and further updating the news recommendation module 530. For example, a positive comment to the recommended news may indicate that the user is interested in the recommended news, and thus keywords of the recommended news, category of the recommended news, or positive sentiment labels of the keywords and/or the category may be added into the user preference list. While a negative comment to the recommended news may indicate that the user is not interested in the recommended news, and thus negative sentiment labels may be appended to keywords and/or category of the recommended news in the user preference list. The sentiment labels discussed above may be determined for the recommended news by the sentiment analysis module.

If determined at 520 that the message is not sentimental comment to the recommended news, the method 500 may proceed to 524 to conduct a pure chat process. In this case, the message may be deemed as inputted for free chatting, and thus the chatbot may provide a response according to a pure chat index set.

It should be appreciated that, depending on specific application requirements, sequence orders of the operations in method 500 may be changed. For example, although the determinations at 504, 510, 516 and 520 are performed sequentially, these determinations may be performed in any other sequence orders. In some implementations, these determinations may also be performed in parallel.

As discussed above, the embodiments of the present disclosure may adopt a sentiment analysis module to perform sentiment analysis. In some implementations, a sentiment analysis classifier may be trained in the sentiment analysis module for performing sentiment analysis. The sentiment analysis classifier may be, such as, a logistic regression classifier.

Conventional sentiment analysis can only classify inputted content into a limited number of emotions, such as, positive emotion, negative emotion and neural emotion. While the sentiment analysis classifier according to the embodiments of the present disclosure may perform a fine-grained sentiment analysis which can classify inputted content into a greater number of emotions.

In an implementation, the sentiment analysis classifier may discriminate 8 types of emotions, including happy, angry, fearful, contemptuous, sad, surprise, disgusted and neutral. It should be appreciated that although the following discussion is related to the sentiment analysis classifier with 8 types of emotions, the embodiments of the present disclosure are not limited to 8 types of emotions. Instead, sentiment analysis classifiers with any other number of emotion types may be obtained under the concept of the present disclosure.

An exemplary sentence with the emotion "happy" may be "I'm so glad to hear that!". An exemplary sentence with the emotion "angry" may be "How dare you ignore that!". An exemplary sentence with the emotion "fearful" may be "It's a terrible accident". An exemplary sentence with the emotion "contemptuous" may be "only a computer cannot be that swagger". An exemplary sentence with the emotion "sad" may be "I don't like it and want to cry". An exemplary sentence with the emotion "surprise" may be "What? Really?". An exemplary sentence with the emotion "disgusted" may be "He is more stupid than I expected". An exemplary sentence with the emotion "neutral" may be "Tomorrow's schedule is determined".

Figure 6:
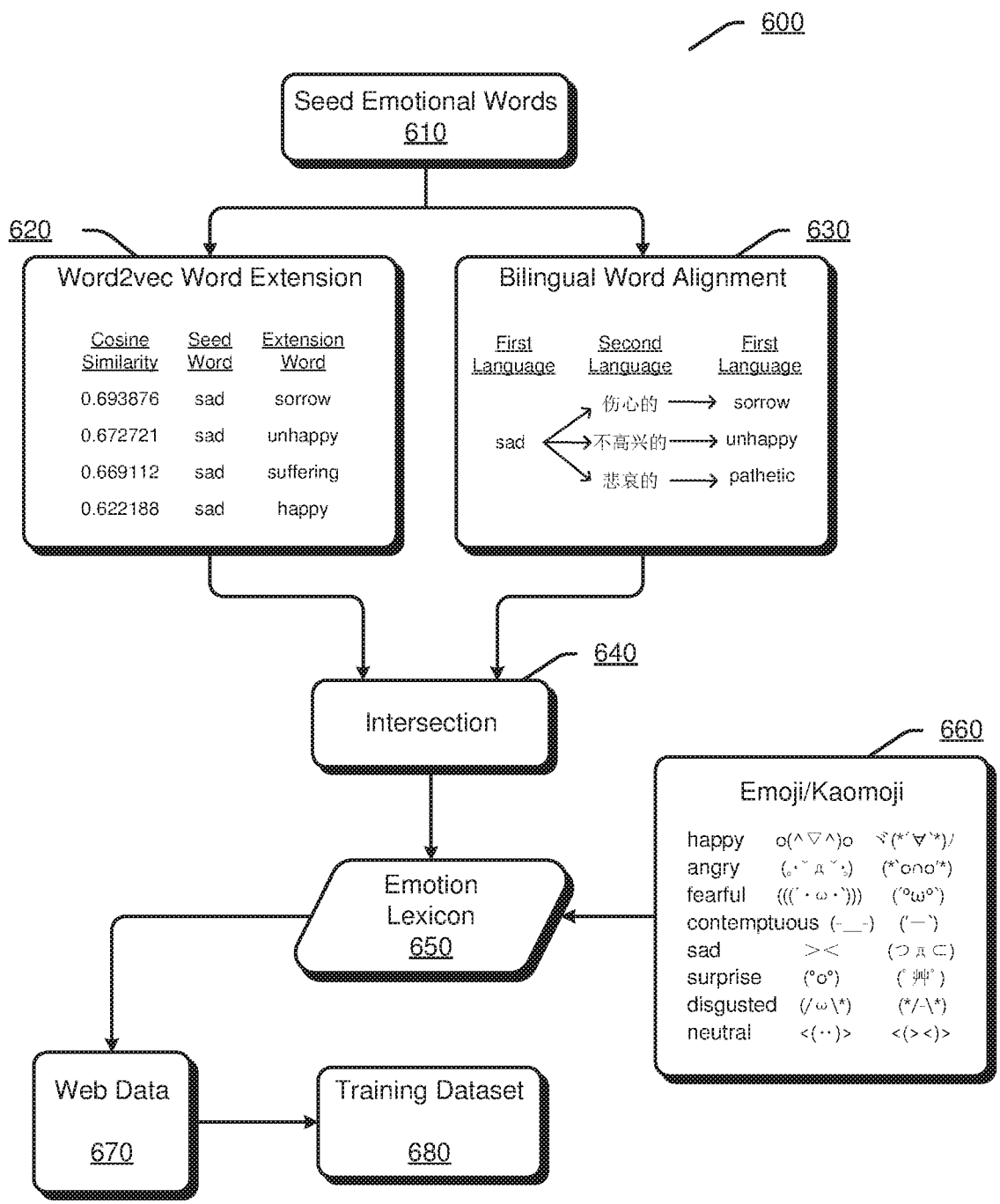
FIG. 6 illustrates an exemplary process for obtaining training dataset for a sentiment analysis classifier according to an embodiment.

FIG. 6 illustrates an exemplary process 600 for obtaining training dataset for a sentiment analysis classifier according to an embodiment. The process 600 may be performed for generating an emotion lexicon by extending seed emotional words, and further determining a training dataset by using the emotion lexicon.

At 610, seed emotional words may be obtained. Herein, the seed emotional words may include emotional words corresponding to each type of emotion. For example, the seed emotional words may include a plurality of words corresponding to the emotion "happy", such as, "happy", "pleased", "glad", "blessed", etc. The seed emotional words may be obtained from existing manually-constructed sentiment lexicons that contain words with manually-labeled emotional polarities. These manually-constructed sentiment lexicons can only provide a limited number of seed emotional words that are not enough for obtaining a training dataset for the sentiment analysis classifier.

At 620, a Word2vec word extension may be performed based on the seed emotional words so as to extend the seed emotional words. A Word2vec cosine similarity score for each seed emotional word and a word from a corpus may be computed. In this way, a number of words, from the corpus, with computed cores may be collected for each emotional word, and then a plurality of top-ranked words may be determined as extension to the seed emotional word. For example, as shown in FIG. 6, for the seed emotional word "sad", extension words "sorrow", "unhappy", "suffering", "happy", etc. may be determined based on the computed Word2vec cosine similarity scores.

It should be appreciated that Word2vec cosine similarity score is computed based on, such as, positions of words in sentences. Thus, the Word2vec word extension cannot ensure that all the extension words have a similar semantic meaning with the corresponding seed emotional word. For example, in FIG. 6, "happy" is determined as an extension word to the seed emotional word "sad", however, these two words have different semantic meanings. Thus, the process 600 further comprises a pruning mechanism, which is based on bilingual word alignment, for removing those extension words having different semantic meanings or weak semantic relevance from corresponding seed emotional words.

At 630, bilingual word alignment may be performed. The bilingual word alignment may be used for finding semantically relevant words to a seed word through a round-trip translating between two different languages. A seed emotional word in a first language may be translated into words in a second language. For example, the seed emotional word "sad" in English may be translated into words "伤心的", "不高兴的" and "悲哀的" in Chinese. Then, the words in the second language may be translated back into words in the first language. For example, the words "伤心 的", "不高兴的" and "悲哀的" in Chinese may be translated back into words "sorrow", "unhappy" and "pathetic" in English. Thus, a list of words "sorrow", "unhappy" and "pathetic" may be obtained through the bilingual word alignment for the seed emotional word "sad".

At 640, an intersection operation may be performed on the extension words obtained by the Word2vec word extension at 620 and the word list obtained by the bilingual word alignment at 630. The intersection operation may be used for removing those extension words, obtained by the Word2vec word extension, having different semantic meanings or weak semantic relevance from corresponding seed emotional words. For example, in FIG. 6, through the intersection operation, the words "sorrow" and "unhappy" may be retained, while the word "suffering" having weak semantic relevance from "sad" and the word "happy" having different semantic meanings from "sad" are removed.

The retained words through the intersection operation may be appended to an emotion lexicon 650. In an implementation, words in the emotion lexicon 650 may be further added by corresponding emoticons, e.g., emoji or kaomoji. At 660, emoji or kaomoji may be collected from the network for each type of emotions. For example, for the emotion "sad", its corresponding emoticons may include, such as, "><", "(つд⊂)", etc. Accordingly, these emoticons may be appended to the words "sad", "sorrow" and "unhappy" corresponding to the emotion "sad" in the emotion lexicon 650.

As discussed above, the emotion lexicon 650 is established by performing Word2vec word extension and bilingual word alignment on seed emotional words, and may include much more words than the manually-constructed sentiment lexicons. The emotion lexicon 650 may be used for finding sentences, from web data 670, that contain at least one word in the emotion lexicon 650. Each of the sentences may be labeled by an emotion of a corresponding word in the emotion lexicon 650 that this sentence contains. These sentences together with corresponding emotional labels may be used for forming a training dataset 680 for the sentiment analysis classifier.

In an implementation, at least one of the following features may be applied in the sentiment analysis classifier: word n-gram; character n-gram; word skip-gram; Brown cluster n-gram; part-of-speech (POS) tags; manually-constructed sentiment lexicons; social network related expressions, e.g., number of hashtags, emoticons, elongated words and punctuations; Word2vec cluster n-gram; and so on.

The sentiment analysis classifier may be trained based on the above features through the training dataset 680.

The sentiment analysis classifier may be used for performing sentiment analysis on news or messages. In an implementation, the sentiment analysis classifier may obtain sentiment analysis distribution for news. For example, if the sentiment analysis classifier is capable of discriminating 8 types of emotions, the sentiment analysis classifier may determine a score of each type of emotion for a piece of news. The scores of the emotions may be presented in various approaches, such as, a mesh figure, a table, etc. In an implementation, the sentiment analysis classifier may obtain sentiment analysis distribution for social comments to a piece of news. For example, the chatbot may collect comments of a number of users to the news, and the sentiment analysis classifier may compute a score of each type of emotion for the comments of the users to the news. The chatbot may keep collecting users' comments, and thus the sentiment analysis distribution for social comments may be updated dynamically. In an implementation, the sentiment analysis classifier may classify inputted content, such as, a message from a user, title of a piece of news, content of a piece of news, into a type of emotion. For example, the inputted content may be classified to a top-ranked emotion.

Figure 7:
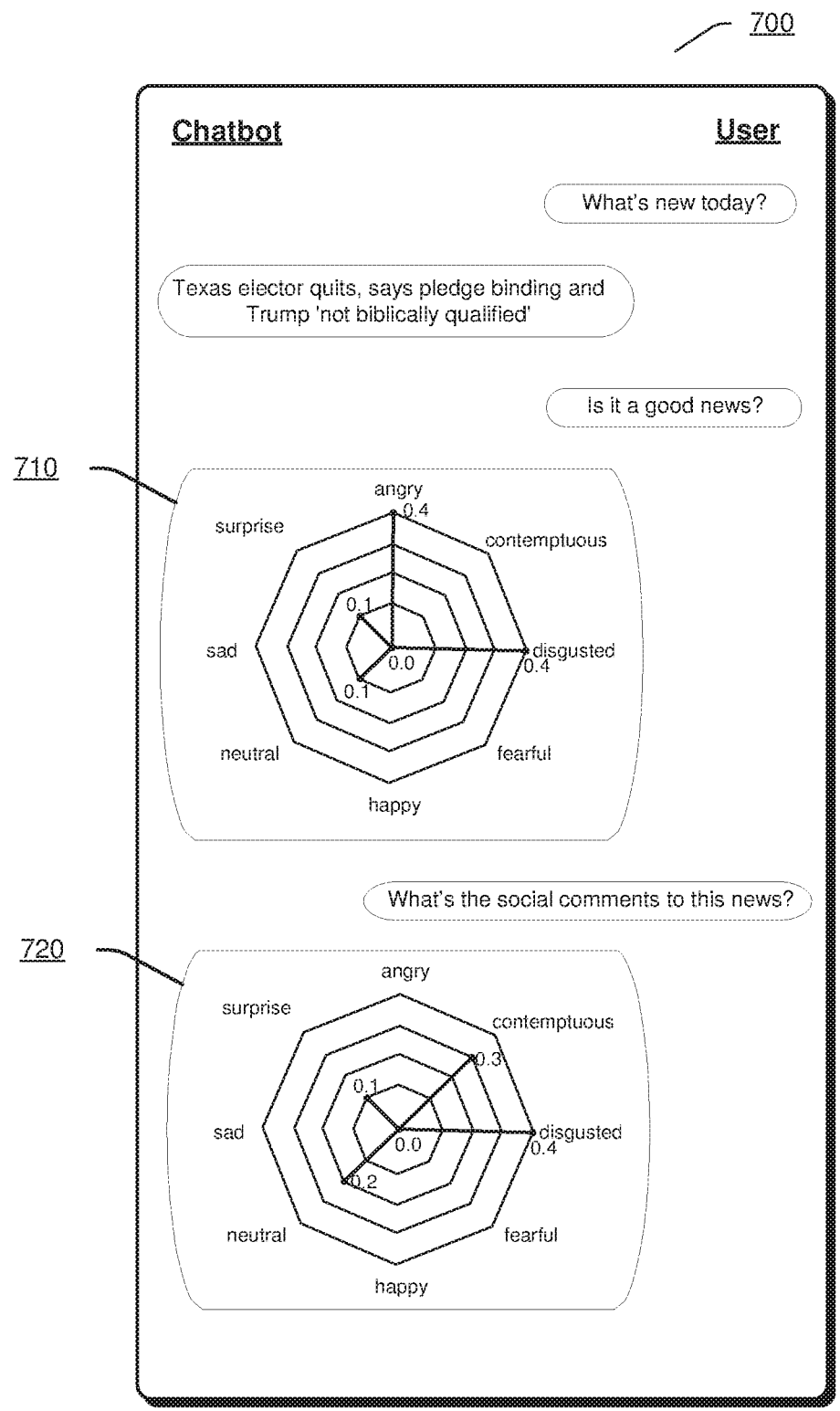
FIG. 7 illustrates an exemplary chat flow for providing sentiment analysis distribution information according to an embodiment.

FIG. 7 illustrates an exemplary chat flow 700 for providing sentiment analysis distribution information according to an embodiment.

When obtaining a message "What's new today?" from the user, the chatbot may provide the user with a title of the recommended news "Texas elector quits, says pledge binding and Trump 'not biblically qualified'". When the user is asking "Is it a good news?", the chatbot may provide a sentiment analysis distribution of the recommended news at 710, where the emotion "angry" has a score of "0.4", the emotion "surprise" has a score of "0.1", the emotion "neutral" has a score of "0.1", the emotion "disgusted" has a score of "0.4", etc. When the user is asking "What's the social comments to this news", the chatbot may provide a sentiment analysis distribution of social comments to the recommended news at 720, where the emotion "contemptuous" has a score of "0.3", the emotion "surprise" has a score of "0.1", the emotion "neutral" has a score of "0.2", the emotion "disgusted" has a score of "0.4", etc. It should be appreciated that although the sentiment analysis distributions are shown by mesh figures in FIG. 7, any other approaches may be used for presenting the sentiment analysis distributions, e.g., by tables, etc.

Figure 8:
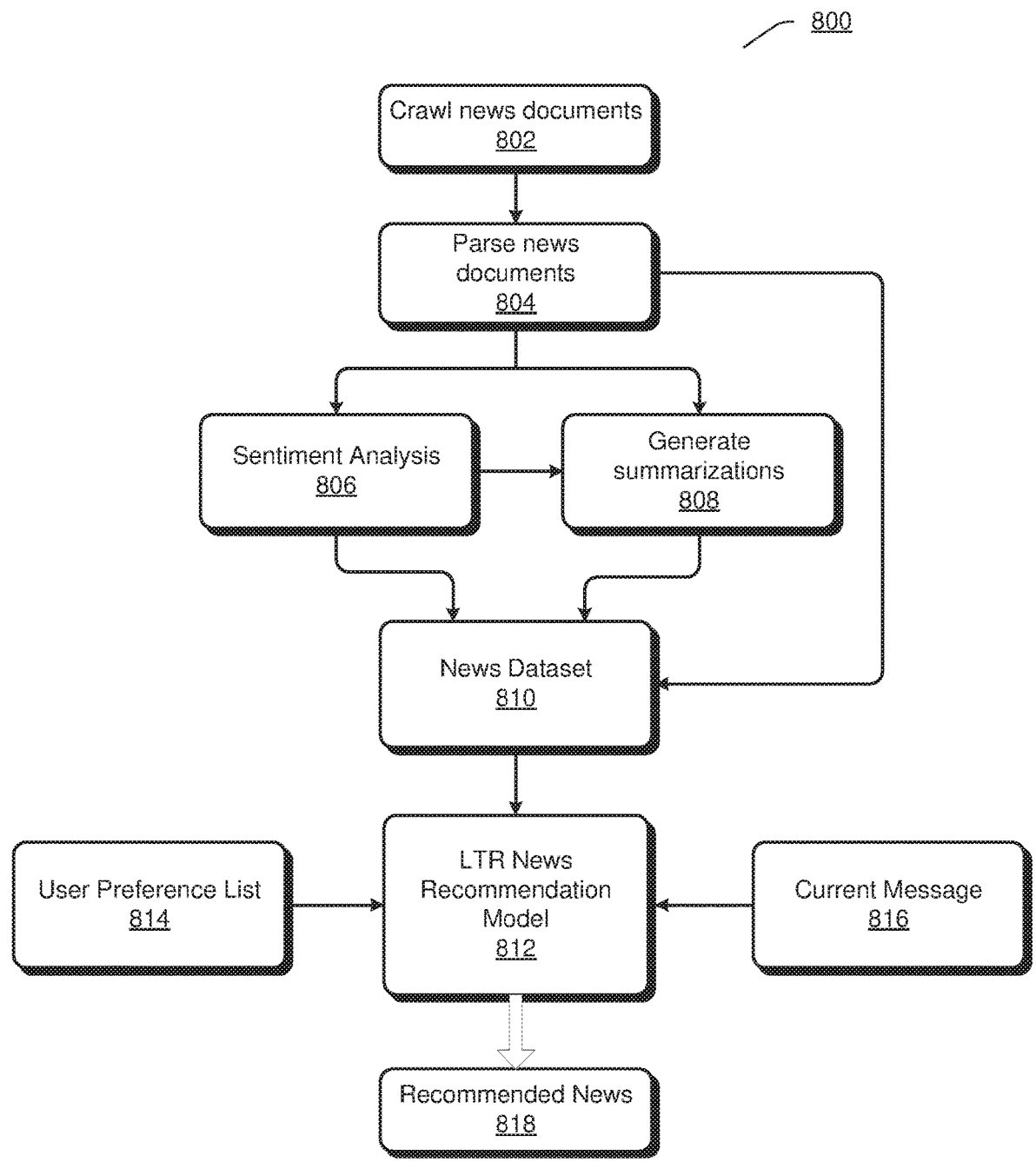
FIG. 8 illustrates an exemplary process for determining recommended news according to an embodiment.

FIG. 8 illustrates an exemplary process 800 for determining recommended news according to an embodiment. The process 800 may be performed by a news recommendation module to determine recommended news in response to a message from the user.

At 802, news documents may be crawled from news sources on the network. The news documents may include information of corresponding news, e.g., title and content of the news. The news documents may further include comments from viewers to the news. The news sources may be news websites or news channels that provide news or reports to the public, e.g., FOX News, BBC News Channel, etc. The crawling of the news documents may be performed automatically and timely.

At 804, the news documents may be parsed. For example, a HTML parser may be used for parsing a news document into <title, content>. If a news document further includes comments, the HTML parser may also parse the news document into <title, content, comments>. Through the parsing at 804, a tuple of <title, content> or <title, content, comments> may be obtained for each news.

At 806, sentiments analysis may be performed on the parsed news documents. For example, a sentiment analysis classifier may be used for determining sentiment labels for titles, contents and comments of the news respectively. A sentiment label may indicate one of a plurality of emotions that can be discriminated by the sentiment analysis classifier. In an implementation, a sentiment label of a piece of news may be further obtained based on a sentiment label of a title of the news and a sentiment label of content of the news.

At 808, a summarization may be generated for each of the news. The summarization may include a plurality of representative sentences selected from the news. In an implementation, a GBDT model may be adopted for generating summarizations. The GBDT model may score sentences in content of a piece of news, and select, such as, the top-ranked 3 sentences to form a summarization of this news.

Training data for the GBDT model may come from a set of news documents with manually-labeled summarizations. For example, a summarization may be labeled for each news document in a news corpus, wherein the summarization may include, such as, 3 sentences selected from the content of the news. The selected 3 sentences may be labeled as "1", while the remaining sentences in the content of the news may be labeled as "0".

The GBDT model may generate a summarization for a piece of news in an iterative way. For example, sentences in the summarization may be determined iteratively. At least one of the following features may be applied in the GBDT model:

Whether or not a sentiment label of a current sentence in the content of the news is similar with a sentiment label of the news, wherein the current sentence is a sentence that is being judged;

The number of words that are shared by the current sentence and the title of the news;

The number of words that are shared by the current sentence and sentences in the current summarization, wherein the current summarization may have contained one or more sentences but does not form the final summarization yet;

The length of the current sentence, e.g., the number of words in the current sentence;

The difference between the length of the current sentence and the average length of the sentences in the content of the news;

The difference between the length of the current sentence and the average length of the sentences in the current summarization;

The maximum and/or average Word2vec similarity between the words in the current sentence and the words in the title of the news;

The maximum and/or average Word2vec similarity between the words in the current sentence and the words in the current summarization; and The number of words shared by the current sentence and the comments to the news, wherein if a word in the current sentence is repeated in a comment, this word may be deemed as drawing more attention of users.

A news dataset 810 may be generated based on the parsed news documents at 804, the sentiment analysis at 806 and the generated summarizations at 808.

The news dataset 810 may include a plurality of candidate news, from which recommended news may be selected. A plurality of candidate news items is included in the news dataset. Each item corresponds to a piece of candidate news, and may include at least one of: title of the candidate news, summarization of the candidate news, content of the candidate news, comments to the candidate news, a sentiment label of the candidate news, a sentiment label of the comments, etc.

The process 800 may adopt a LTR news recommendation model 812 for scoring candidate news. In an implementation, the LTR news recommendation model 812 may be a GBDT-based model. Inputs to the LTR news recommendation model 812 may comprise the news dataset 810, a user preference list 814, and a current message 816.

As discussed above, the user preference list 814 may comprise a list of words, such as, keywords of interested news, and/or categories of the interested news. The user preference list 814 may further comprise sentiment labels of the words. Through having the user preference list 814 as input, the LTR news recommendation model 812 may consider personalized information in the user preference list 814 when scoring and ranking the candidate news in the news dataset 810.

The current message 816 may be a message currently inputted by the user. For example, this current message 816 may have been determined as indicating an intension of the user to obtain news recommendation at 504 of FIG. 5.

At least one of the following features may be applied in the LTR news recommendation model 812:

The number of words shared by a title of a piece of candidate news and the user preference list;

The number of words shared by the current message and the user preference list;

The number of words shared by the title of the candidate news and the current message;

The ratio of the number of words shared by the title of the candidate news and the user preference list divided by the number of words in the title of the candidate news;

The ratio of the number of words shared by the current message and the user preference list divided by the number of words in the current message;

The ratio of the number of words shared by the user preference list and the candidate news divided by the number of words in the user preference list;

The maximum and/or average Word2vec similarity between the words in the title of the candidate news and the words in the user preference list;

The maximum and/or average Word2vec similarity between the words in the current message and the words in the user preference list;

The maximum and/or average Word2vec similarity between the words in the title of the candidate news and the words in the current message;

Whether or not a sentiment label of the candidate news is similar with a sentiment label of the current message, wherein this feature may facilitate to align the recommended news with an emotional tendency of the current message from the user;

Whether or not the sentiment label of the candidate news is similar with a sentiment label of a relevant word in the user preference list, wherein this feature may facilitate to align the recommended news with an emotional tendency of the user;

The sentiment label of the candidate news;

The average sentiment label of comments to the candidate news; and

The number of topic words shared by the candidate news and other candidate news, wherein this feature may facilitate to enhance weights of the candidate news having topic diversity.

A list of scored candidate news may be outputted by the LTR news recommendation model 812. Then, recommended news, e.g., the top-ranked candidate news, may be determined at 818.

It should be appreciated that, upon a request from the user, e.g., "Give me a summarization", a summarization of the recommended news, which is generated at 808 and maintained in the news dataset 810, may also be provided to the user.

Figure 9:
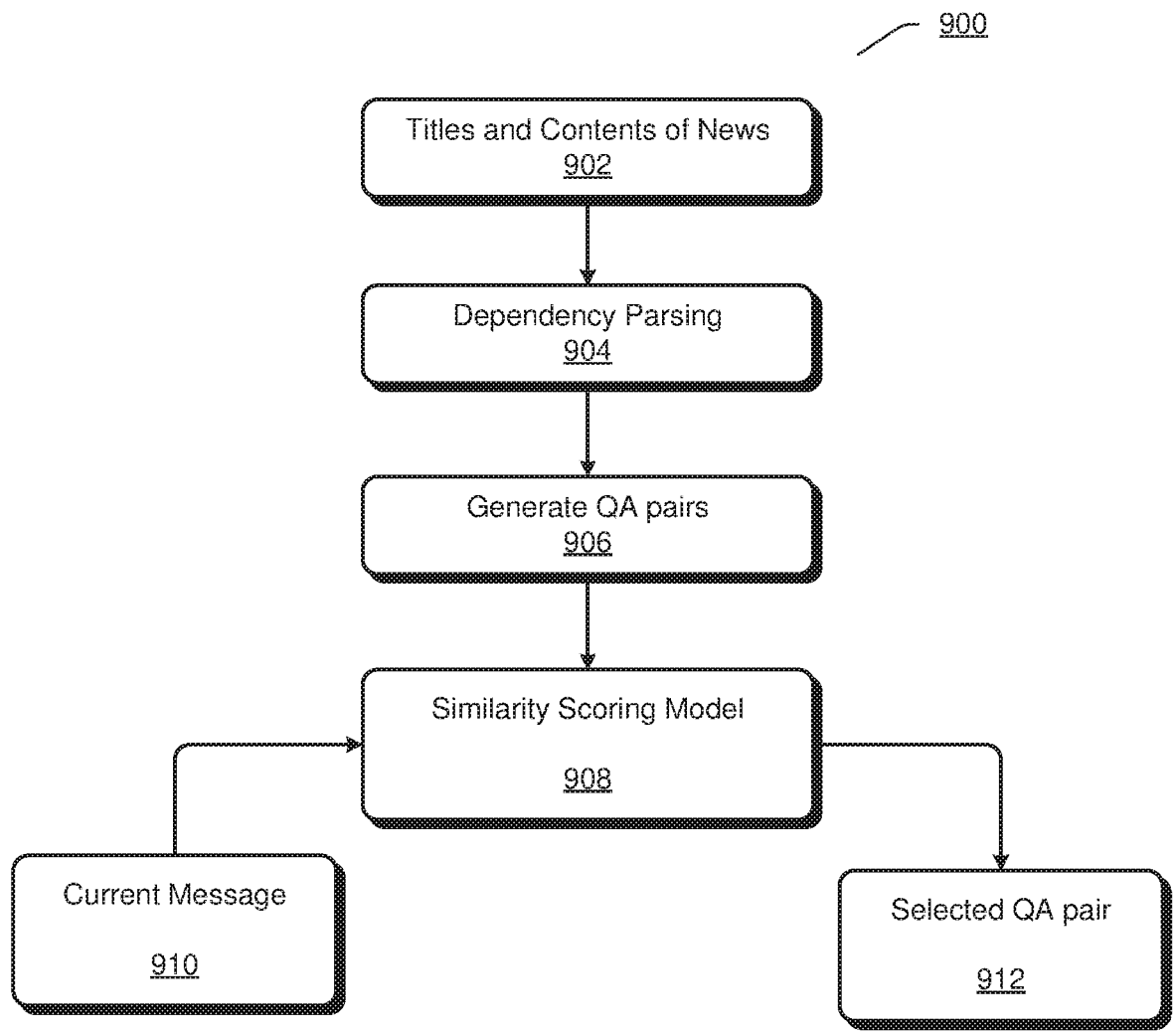
FIG. 9 illustrates an exemplary process for determining a question-answer pair according to an embodiment.

FIG. 9 illustrates an exemplary process 900 for determining a question-answer pair according to an embodiment. The process 900 may be used for determining an answer to a question of the user on a piece of recommended news. The process 900 may comprise two phases, one phase is for establishing a knowledge-based QA set, and another phase is for selecting a QA pair through a similarity scoring model. The process 900 may be performed by a knowledge-based QA module.

At 902, titles and contents of a set of news may be obtained. For example, the titles and contents of the news may be retrieved from the news dataset 810 in FIG. 8.

Figure 10:
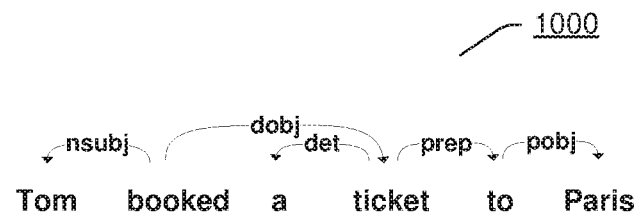
FIG. 10 illustrates an exemplary dependency parsing on an exemplary sentence according to an embodiment.

At 904, dependency parsing may be applied on the titles and contents of the news. Any existing dependency parser may be adopted for performing dependency parsing, e.g., predicate-argument structure analysis. Through dependency parsing, dependency arcs and dependency roles among words of a sentence may be obtained. FIG. 10 illustrates an exemplary dependency parsing 1000 on an exemplary sentence according to an embodiment. Assuming that a sentence "Tom booked a ticket to Paris" is inputted to the dependency parsing. The word "booked" is determined as a predicate of the sentence. A dependency arc from "booked" to "Tom" is determined, and the dependency role between "Tom" and "booked" is determined as "nsubj", where "nsubj" denotes nominal subject. A dependency arc from "booked" to "ticket" is determined, and the dependency role between "ticket" and "booked" is determined as "dobj", where "dobj" denotes direct subject. A dependency arc from "ticket" to "a" is determined, and the dependency role between "a" and "ticket" is determined as "det", where "det" denotes determiner. A dependency arc from "ticket" to "to" is determined, and the dependency role between "to" and "ticket" is determined as "prep", where "prep" denotes preposition. A dependency arc from "to" to "Paris" is determined, and the dependency role between "Paris" and "to" is determined as "pobj", where "pobj" denotes object of preposition. It should be appreciated that the dependency roles shown in FIG. 10 are exemplary, and for other sentences, various dependency roles may be determined through the dependency parsing.

At 906, QA pairs may be generated based on the dependency parsing at 904. For a sentence having been performed the dependency parsing, a plurality of question-answer pairs may be generated in terms of different dependency roles in the sentence and by reference to well-known question patterns. Herein, the question patterns may indicate what sentence structure and question word may be used for questioning an argument in the sentence. Taking the sentence "Tom booked a ticket to Paris" as an example, a question-answer pair of "Who booked a ticket to Paris?" and "Tom" may be generated for questioning the subject argument "Tom", a question-answer pair of "What ticket did Tom book?" and "To Paris" may be generated for questioning the object of preposition argument "Paris", etc. At 906, the generated QA pairs may also be collected to form the knowledge-based QA set. QA pairs in the knowledge-based QA set may also be referred to as candidate QA pairs which are further used as candidate questions and candidate answers in the following determining process of an answer to a user's question.

A similarity scoring model 908 may be applied in the process 900. The similarity scoring model 908 may be used for finding an answer to a user's question from the candidate QA pairs in the knowledge-based QA set. For example, the similarity scoring model 908 may calculate similarities between the user's question and the candidate QA pairs in the knowledge-based QA set. Features of the similarity scoring model 908 may include at least one of: edit distance in a word level between a user's question and a candidate question; edit distance in a character level between a user's question and a candidate question; Word2Vec similarity between a user's question and a candidate question; BM25 score between a user's question and a candidate QA pairs; and so on. Upon obtaining similarity scores for the QA pairs in the knowledge-based QA set, a candidate answer corresponding to the top-ranked QA pair may be determined as an answer to the user's question.

As shown in FIG. 9, a current message 910 from the user may be provided to the similarity scoring model 908. The current message 910 may be a question on the recommended news that has been provided to the user, e.g., the questions "Who?" and "How many electors are there in Texas?" in FIG. 4.

In response to the current message 910, the similarity scoring model 908 may output a selected QA pair 912. This selected QA pair 912 may be the top-ranked QA pair in the knowledge-based QA set, and thus a candidate answer in the selected QA pair 912 may be determined as an answer to the current message 910. For example, if the user's question is "How many electors are there in Texas?", and a candidate QA pair of "What's the number of electors in Texas?" and "38 electors in Texas" is selected through the similarity scoring model 908, then "38 electors in Texas" in the selected candidate QA pair may be provided as an answer to the user's question.

In some cases, the user's question may be short and simple, e.g., "Who?", which does not contain enough information for the similarity scoring model 908 to determine an answer. Thus, in some implementations, before providing the current message 910 to the similarity scoring model 908, the question included in the current message 910 may be extended based on the recommended news through dependency parsing.

Question words in the user's question may be determined, such as, "who", "when", "where", "what", "which", etc.

Then, a series of rules may be applied for finding information from the recommended news that is relevant to the questions words. For example, for a question word "who", named entities and predicate-argument structure of a previous response regarding the recommended news by the chatbot may be determined. For a question word "when", time and date related words/phrases in a previous response by the chatbot may be determined. For a question word "where", space/location related words/phrases in a previous response by the chatbot may be determined. For a question word "what", predicate-argument structure of a previous response by the chatbot may be determined. For a question word "which", modifying words corresponding to the question word in a previous response by the chatbot may be determined.

The user's question may be extended with the information determined above. For example, when the user is asking "Who?" in FIG. 4, considering that the previous response "Texas elector quits, says pledge binding and Trump 'not biblically qualified'" includes two named entities, e.g., "Texas elector" and "Trump", the user's question may be extended in two directions, one is for "Texas elector" and another is for "Trump". However, since the previous response and the recommended news are more about the Texas elector instead of Trump, the direction for "Texas elector" may be selected. Based on a predicate-argument structure of the previous response, the user's question may be extended as "Who is the Texas elector that quits, says pledge binding and Trump 'not biblically qualified'?". This extended question may be provided to the similarity scoring model 908 which can further determine an answer "Art Sisneros".

As discussed above, according to the embodiments of the present disclosure, the chatbot may provide news recommendation in a "width" way. If the user intends to switch from the current recommended news to other news, the chatbot may provide other recommended news based on a topic graph. Herein, the topic graph may include mapping information among topics of a set of news. The switching of news may correspond to a switching of topics of the news. For example, if the current recommended news has a first topic, and a second topic associated with the first topic is determined from the topic graph, then a piece of candidate news relating to the second topic may be provided as further recommended news.

Figure 11:
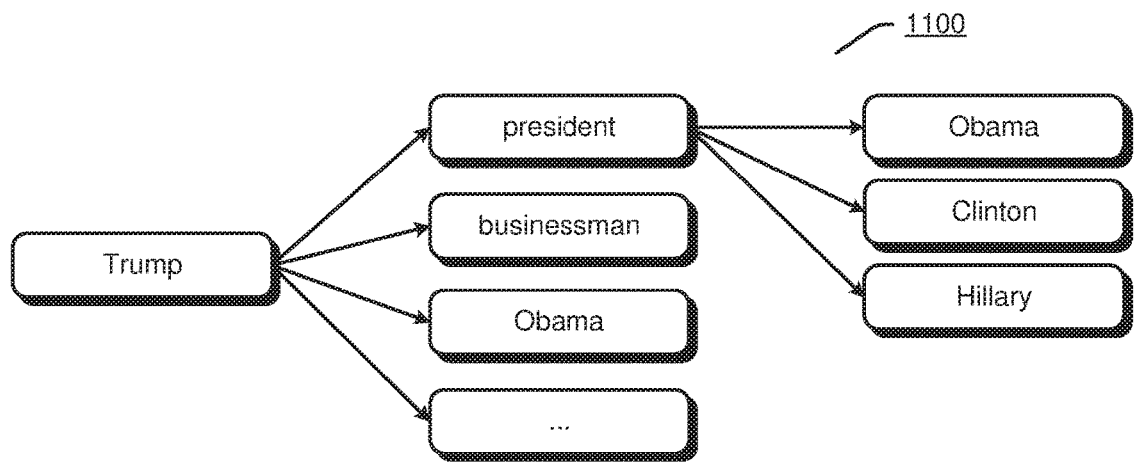
FIG. 11 illustrates an exemplary topic graph according to an embodiment.

FIG. 11 illustrates an exemplary topic graph 1100 according to an embodiment. As shown in FIG. 11, the topic "Trump" has a plurality of related topics, e.g., "president", "businessman", "Obama", etc. The topic "president" further has a plurality of related topics, e.g., "Obama", "Clinton", "Hillary", etc.

Figure 12:
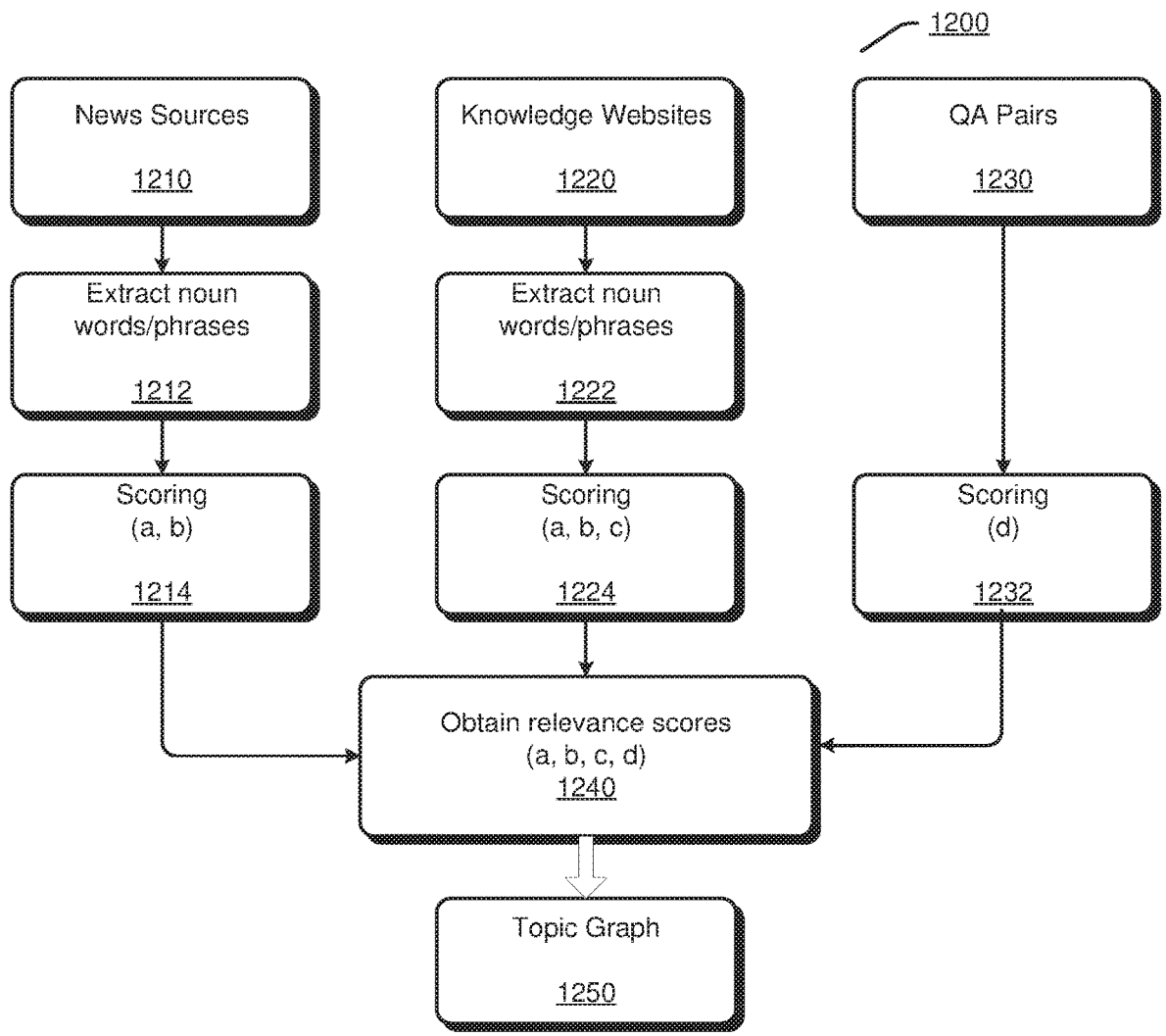
FIG. 12 illustrates an exemplary process for establishing a topic graph according to an embodiment.

FIG. 12 illustrates an exemplary process 1200 for establishing a topic graph according to an embodiment. The topic graph may be established from various sources through data mining.

In an implementation, the data mining may be performed on news sources 1210. The news sources 1210 may be, such as, news websites or news channels.

Assuming that the flowing paragraph is obtained from the news sources 1210: "A Texas Republican announced over the weekend that he plans to resign his post as a member of the Electoral College rather than cast a ballot for US President-elect Donald Trump, a man he deems 'not biblically qualified for office'. There have been only 157 faithless electors in all of American history, according to the nonprofit FairVote, and none have affected a presidential race". At 1212, noun words/phrases may be extracted from the paragraph. For example, "Texas Republican", "Electoral College", "Donald Trump", "FairVote", and "presidential race" may be extracted from the paragraph.

At 1214, topic pairs formed by the extracted noun words/phrases may be scored. For example, a pair of words/phrases may be scored "a" if the words/phrases in the topic pair appear in one sentence, while a pair of words/phrases may be scored "b" if the words/phrases in the topic pair appear in one paragraph instead of one sentence.

For the above exemplary paragraph, the scores of the topic pairs are shown in the following Table 1:

TABLE 1

| Texas Republican | Electoral College | a |
| Texas Republican | Donald Trump | a |
| Electoral College | Donald Trump | a |
| FairVote | presidential race | a |
| Texas Republican | FairVote | b |
| Electoral College | FairVote | b |
| Donald Trump | FairVote | b |
| Texas Republican | presidential race | b |
| Electoral College | presidential race | b |
| Donald Trump | presidential race | b |

In an implementation, the data mining may be performed on knowledge websites 1220 on the network, e.g., Wikipedia.

Assuming that the flowing page is obtained from the knowledge websites 1220: "Title=Donald Trump", and "Content=Donald John Trump (born on Jun. 14, 1946) is an American businessman, television personality, politician, and the 45th President of the United States". Noun words/phrases may be extracted from the page at 1222. For example, "Donald Trump", "American businessman", "television personality", "politician", "President", and "United States" may be extracted from the page.

At 1224, topic pairs formed by the extracted noun words/phrases may be scored. For example, all the pairs of words/phrases formed by the title entity "Donald Trump" with other extracted words/phrases may be scored "c". Moreover, the scoring mechanism of "a" and "b" at 1214 may also be applied at 1224. The scores of the topic pairs may be obtained at 1224. For example, a topic pair of "Donald Trump" and "American businessman" may be scored "c", a topic pair of "American businessman" and "politician" may be scored "a", etc.

In an implementation, the data mining may be performed on QA pairs 1230 that are from QA-style websites, or from a pure chat index set used by the chatbot for free chatting.

At 1232, for each QA pair, word alignment scores "d" may be computed for topic pairs formed by words in a question of the QA pair and words in an answer of the QA pair. The major idea of the computing of word alignment scores is to determine co-occurrence frequency of two words in sentence pairs in the whole corpus. For example, IBM models 1-5 together with an Expectation Maximization (EM) algorithm may be adopted at 1232 for computing the word alignment scores.

At 1240, relevance scores may be obtained for each topic pair based on the scoring at 1214, 1224 and 1232. For example, for a topic pair, a sum or a weight sum of corresponding scores obtained at 1214, 1224 and 1232 may be used as the relevance score for the topic pair.

Then, the topic graph 1250 may be established. For example, for a first topic, those topics having the top-ranked relevance scores with the first topic may be added into the topic graph, and thus mappings from the first topic to these topics may be included in the topic graph. In this way, one or more further stages of mappings may be included in the topic graph.

The topic graph 1250 may be further used for the switching among a set of recommended news.

Figure 13:
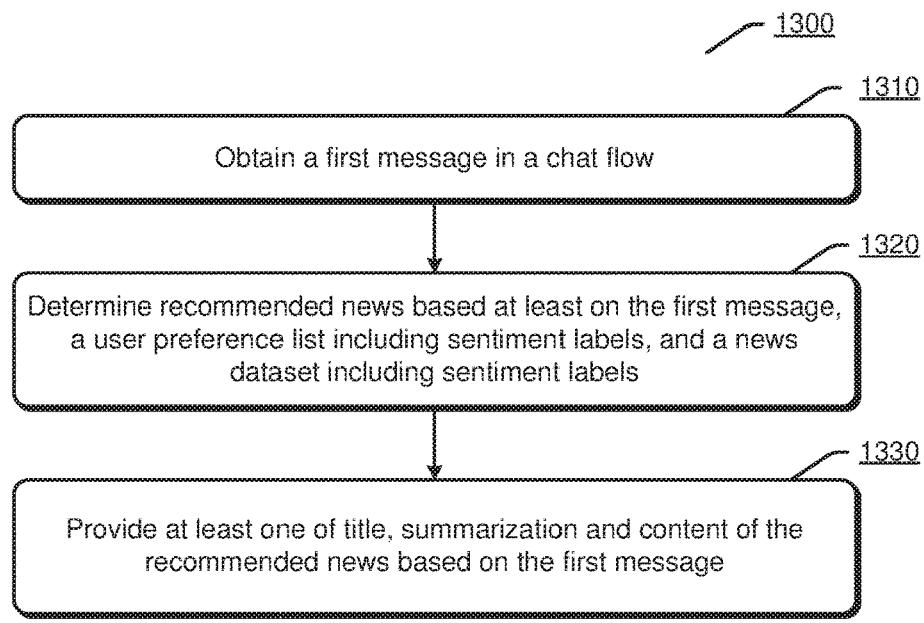
FIG. 13 illustrates a flowchart of an exemplary method for providing news recommendation in automated chatting according to an embodiment.

FIG. 13 illustrates a flowchart of an exemplary method 1300 for providing news recommendation in automated chatting according to an embodiment.

At 1310, a first message may be obtained in a chat flow.

At 1320, recommended news may be determined based at least on the first message, a user preference list including sentiment labels, and a news dataset including sentiment labels.

At 1330, at least one of title, summarization and content of the recommended news may be provided based on the first message.

In an implementation, the first message may be expressed by natural language. The first message and the at least one of title, summarization and content of the recommended news may be in a form of text or voice.

In an implementation, the method 1300 may further comprise: determining that the first message indicates an intention of obtaining news recommendation.

In an implementation, the user preference list may comprise keywords and/or categories of news that a user is interested in, and sentiment labels of the keywords and/or categories. The news dataset may comprise a plurality of candidate news items, each item corresponding to a piece of candidate news and including at least one of: title of the candidate news, summarization of the candidate news, content of the candidate news, comments to the candidate news, a sentiment label of the candidate news, and a sentiment label of the comments.

In an implementation, the method 1300 may further comprise: obtaining a second message in the chat flow; determining that the second message includes sentimental comment to the recommended news; and updating the user preference list based on the sentimental comment in the second message.

In an implementation, the method 1300 may further comprise: obtaining a second message in the chat flow; determining that the second message includes a question on the recommended news; and determining an answer to the question from a knowledge-based QA set. In an implementation, the method 1300 may further comprise: extending the question based on the recommended news through dependency parsing. In an implementation, the method 1300 may further comprise: obtaining a third message in the chat flow; determining that the third message includes sentimental comment to the answer; and updating the knowledge-based QA set based on the sentimental comment in the third message.

In an implementation, the method 1300 may further comprise at least one of: providing sentiment analysis distribution information of the recommended news through performing sentiment analysis on the recommended news; and providing sentiment analysis distribution information of social comments to the recommended news through performing sentiment analysis on the social comments.

In an implementation, the performing the sentiment analysis may comprise: performing the sentiment analysis through a sentiment analysis classifier, the sentiment analysis classifier being trained by a training dataset, the training dataset being obtained by using an emotion lexicon, the emotion lexicon being established at least by performing Word2vec word extension and bilingual word alignment on seed emotional words.

In an implementation, the method 1300 may further comprise: obtaining a second message in the chat flow; determining that the second message indicates an intention of switching to other news recommendation; determining second recommended news associated with the recommended news based at least on a predetermined topic graph, the topic graph including a plurality of topic pairs, each topic pair corresponding to two groups of news that are associated with each other; and providing at least one of title, summarization and content of the second recommended news.

It should be appreciated that the method 1300 may further comprise any steps/processes for providing news recommendation in automated chatting according to the embodiments of the present disclosure as mentioned above.

Figure 14:
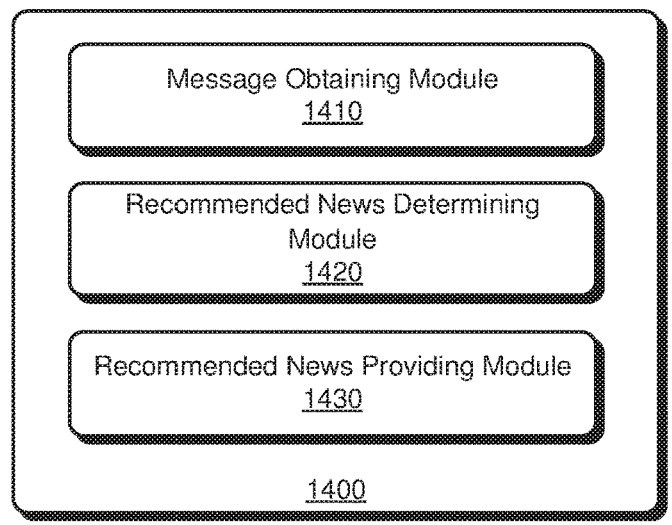
FIG. 14 illustrates an exemplary apparatus for providing news recommendation in automated chatting according to an embodiment.

FIG. 14 illustrates an exemplary apparatus 1400 for providing news recommendation in automated chatting according to an embodiment.

The apparatus 1400 may comprise: a message obtaining module 1410, for obtaining a first message in a chat flow; a recommended news determining module 1420, for determining recommended news based at least on the first message, a user preference list including sentiment labels, and a news dataset including sentiment labels; and a recommended news providing module 1430, for providing at least one of title, summarization and content of the recommended news based on the first message.

In an implementation, the apparatus 1400 may further comprise: an intention determining module, for determining that the first message indicates an intention of obtaining news recommendation.

In an implementation, the user preference list may comprise keywords and/or categories of news that a user is interested in, and sentiment labels of the keywords and/or categories. The news dataset may comprise a plurality of candidate news items, each item corresponding to a piece of candidate news and including at least one of: title of the candidate news, summarization of the candidate news, content of the candidate news, comments to the candidate news, a sentiment label of the candidate news, and a sentiment label of the comments.

In an implementation, the message obtaining module 1410 is further for obtaining a second message in the chat flow, and the apparatus 1400 may further comprise: a sentimental comment determining module, for determining that the second message includes sentimental comment to the recommended news; and a user preference list updating module, for updating the user preference list based on the sentimental comment in the second message.

In an implementation, the message obtaining module 1410 is further for obtaining a second message in the chat flow, and the apparatus 1400 may further comprise: a question determining module, for determining that the second message includes a question on the recommended news; and an answer determining module, for determining an answer to the question from a knowledge-based QA set. In an implementation, the apparatus 1400 may further comprise: a question extending module, for extending the question based on the recommended news through dependency parsing. In an implementation, the message obtaining module 1410 is further for obtaining a third message in the chat flow, and the apparatus 1400 may further comprise: a sentimental comment determining module, for determining that the third message includes sentimental comment to the answer; and a knowledge-based QA set updating module, for updating the knowledge-based QA set based on the sentimental comment in the third message.

In an implementation, the apparatus 1400 may further comprise a sentiment analysis distribution information providing module, for at least one of: providing sentiment analysis distribution information of the recommended news through performing sentiment analysis on the recommended news; and providing sentiment analysis distribution information of social comments to the recommended news through performing sentiment analysis on the social comments.

In an implementation, the message obtaining module 1410 is further for obtaining a second message in the chat flow. The apparatus 1400 may further comprise an intention determining module for determining that the second message indicates an intention of switching to other news recommendation. The recommended news determining module 1420 is further for determining second recommended news associated with the recommended news based at least on a predetermined topic graph, the topic graph including a plurality of topic pairs, each topic pair corresponding to two groups of news that are associated with each other. The recommended news providing module 1430 is further for providing at least one of title, summarization and content of the second recommended news.

Moreover, the apparatus 1400 may also comprise any other modules configured for performing any operations of the methods for providing news recommendation in automated chatting according to the embodiments of the present disclosure as mentioned above.

Figure 15:
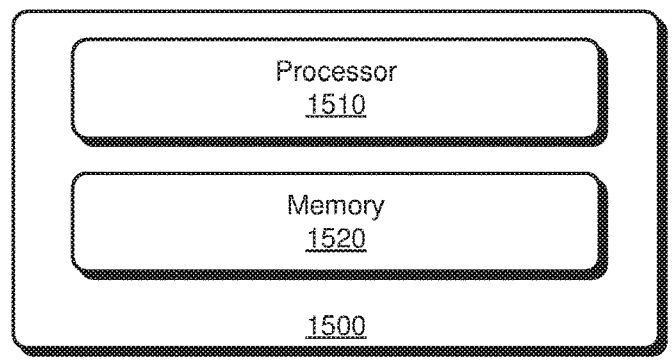
FIG. 15 illustrates an exemplary apparatus for providing news recommendation in automated chatting according to an embodiment.

FIG. 15 illustrates an exemplary apparatus 1500 for providing news recommendation in automated chatting according to an embodiment.

The apparatus 1500 may comprise a processor 1510. The apparatus 1500 may further comprise a memory 1520 that is connected with the processor 1510. The memory 1520 may store computer-executable instructions that, when executed, cause the processor 1510 to perform any operations of the methods for providing news recommendation in automated chatting according to the embodiments of the present disclosure as mentioned above.

The embodiments of the present disclosure may be embodied in a non-transitory computer-readable medium. The non-transitory computer-readable medium may comprise instructions that, when executed, cause one or more processors to perform any operations of the methods for providing news recommendation in automated chatting according to the embodiments of the present disclosure as mentioned above.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout the present disclosure, the memory may be internal to the processors (e.g., cache or register).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skill in the art are expressly incorporated herein by reference and are intended to be encompassed by the claims.

What is claimed is:

1. A method for providing news recommendation in automated chatting, comprising:
    obtaining a first message in a chat flow;
    determining recommended news based at least on the first message, a user preference list including first sentiment labels, and a news dataset including second sentiment labels, wherein the first sentiment labels indicate one or more corresponding emotions for the user preference list, and wherein the second sentiment labels indicate one or more corresponding emotions for the news dataset; and
    providing at least one of title, summarization and content of the recommended news based on the first message.

2. The method of claim 1, further comprising:
    obtaining a second message in the chat flow;
    determining that the second message includes a question on the recommended news; and
    determining an answer to the question from a knowledge-based question-answer (QA) set.

3. The method of claim 2, further comprising:
    extending the question based on the recommended news through dependency parsing.

4. The method of claim 2, further comprising:
    obtaining a third message in the chat flow;
    determining that the third message includes sentimental comment to the answer; and
    updating the knowledge-based QA set based on the sentimental comment in the third message.

5. The method of claim 1, further comprising at least one of:
    providing sentiment analysis distribution information of the recommended news through performing sentiment analysis on the recommended news; and
    providing sentiment analysis distribution information of social comments to the recommended news through performing sentiment analysis on the social comments.

6. The method of claim 5, wherein the performing the sentiment analysis comprises:
    performing the sentiment analysis through a sentiment analysis classifier, the sentiment analysis classifier being trained by a training dataset, the training dataset being obtained by using an emotion lexicon, the emotion lexicon being established at least by performing Word2vec word extension and bilingual word alignment on seed emotional words.

7. The method of claim 1, wherein
    the first message is expressed by natural language, and the first message and the at least one of title, summarization and content of the recommended news are in a form of text or voice.

8. The method of claim 1, further comprising:
    determining that the first message indicates an intention of obtaining news recommendation.

9. The method of claim 1, wherein
    the user preference list comprises keywords and/or categories of news that a user is interested in, and sentiment labels of the keywords and/or categories, and
    the news dataset comprises a plurality of candidate news items, each item corresponding to a piece of candidate news and including at least one of: title of the candidate news, summarization of the candidate news, content of the candidate news, comments to the candidate news, a sentiment label of the candidate news, and a sentiment label of the comments.

10. The method of claim 1, further comprising:
    obtaining a second message in the chat flow;
    determining that the second message includes sentimental comment to the recommended news; and
    updating the user preference list based on the sentimental comment in the second message.

11. The method of claim 1, further comprising:
    obtaining a second message in the chat flow;
    determining that the second message indicates an intention of switching to other news recommendation;
    determining second recommended news associated with the recommended news based at least on a predetermined topic graph, the topic graph including a plurality of topic pairs, each topic pair corresponding to two groups of news that are associated with each other; and
    providing at least one of title, summarization and content of the second recommended news.

12. An apparatus for providing news recommendation in automated chatting, comprising:
    a message obtaining module, for obtaining a first message in a chat flow;
    a recommended news determining module, for determining recommended news based at least on the first message, a user preference list including first sentiment labels, and a news dataset including second sentiment labels, wherein the first sentiment labels indicate one or more corresponding emotions for the user preference list, and wherein the second sentiment labels indicate one or more corresponding emotions for the news dataset; and
    a recommended news providing module, for providing at least one of title, summarization and content of the recommended news based on the first message.

13. The apparatus of claim 12, wherein the message obtaining module is further for obtaining a second message in the chat flow, and the apparatus further comprises:
    a question determining module, for determining that the second message includes a question on the recommended news; and
    an answer determining module, for determining an answer to the question from a knowledge-based question-answer (QA) set.

14. The apparatus of claim 13, further comprising:
    a question extending module, for extending the question based on the recommended news through dependency parsing.

15. The apparatus of claim 13, wherein the message obtaining module is further for obtaining a third message in the chat flow, and the apparatus further comprises:
    a sentimental comment determining module, for determining that the third message includes sentimental comment to the answer; and
    a knowledge-based QA set updating module, for updating the knowledge-based QA set based on the sentimental comment in the third message.

16. The apparatus of claim 12, further comprising:
    an intention determining module, for determining that the first message indicates an intention of obtaining news recommendation.

17. The apparatus of claim 12, wherein
    the user preference list comprises keywords and/or categories of news that a user is interested in, and sentiment labels of the keywords and/or categories, and the news dataset comprises a plurality of candidate news items, each item corresponding to a piece of candidate news and including at least one of: title of the candidate news, summarization of the candidate news, content of the candidate news, comments to the candidate news, a sentiment label of the candidate news, and a sentiment label of the comments.

18. The apparatus of claim 12, wherein the message obtaining module is further for obtaining a second message in the chat flow, and the apparatus further comprises:
   a sentimental comment determining module, for determining that the second message includes sentimental comment to the recommended news; and
   a user preference list updating module, for updating the user preference list based on the sentimental comment in the second message.

19. The apparatus of claim 12, further comprising a sentiment analysis distribution information providing module, for at least one of:
   providing sentiment analysis distribution information of the recommended news through performing sentiment analysis on the recommended news; and
   providing sentiment analysis distribution information of social comments to the recommended news through performing sentiment analysis on the social comments.

20. The apparatus of claim 12, wherein
   the message obtaining module is further for obtaining a second message in the chat flow,
   the apparatus further comprises an intention determining module, for determining that the second message indicates an intention of switching to other news recommendation,
   the recommended news determining module is further for determining second recommended news associated with the recommended news based at least on a predetermined topic graph, the topic graph including a plurality of topic pairs, each topic pair corresponding to two groups of news that are associated with each other, and
   the recommended news providing module is further for providing at least one of title, summarization and content of the second recommended news.

* * * * *